United States Patent
Stojkovic et al.

(10) Patent No.: US 10,471,901 B2
(45) Date of Patent: *Nov. 12, 2019

(54) VEHICLE TAILGATE SYSTEM

(71) Applicant: FORD GLOBAL TECHNOLOGIES, LLC, Dearborn, MI (US)

(72) Inventors: Dragan B. Stojkovic, Taylor, MI (US); Jack Marchlewski, Saline, MI (US); Joshua Robert Hemphill, White Lake, MI (US); Stephen William Gallagher, Bloomfield Hills, MI (US); Colleen Marie Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,238

(22) Filed: Nov. 15, 2018

(65) Prior Publication Data

US 2019/0084490 A1 Mar. 21, 2019

Related U.S. Application Data

(62) Division of application No. 15/430,010, filed on Feb. 10, 2017, now Pat. No. 10,160,396.

(51) Int. Cl.

| B60R 9/00 | (2006.01) |
|---|---|
| B60R 9/06 | (2006.01) |
| B62D 33/027 | (2006.01) |
| B60P 7/08 | (2006.01) |
| B60R 5/04 | (2006.01) |
| B60P 3/14 | (2006.01) |
| B60R 9/10 | (2006.01) |
| B60R 11/06 | (2006.01) |

(Continued)

(52) U.S. Cl.
CPC ............... *B60R 9/06* (2013.01); *B60P 3/14* (2013.01); *B60P 7/08* (2013.01); *B60R 5/04* (2013.01); *B60R 9/10* (2013.01); *B60R 11/06* (2013.01); *B62D 33/0273* (2013.01); *B62D 33/03* (2013.01); *B60R 2011/0052* (2013.01); *B60R 2011/0066* (2013.01); *B60R 2011/0075* (2013.01)

(58) Field of Classification Search
CPC .. B60R 9/06; B60R 9/10; B60R 11/06; B60R 2011/0052; B60R 2011/0066; B60R 2011/0075; B60P 3/14; B62D 33/0273; B62D 33/03
USPC .......................................................... 224/403
See application file for complete search history.

(56) References Cited

U.S. PATENT DOCUMENTS

| 4,787,809 A | 11/1988 | Zrostlik |
|---|---|---|
| 4,813,842 A | 3/1989 | Morton |

(Continued)

FOREIGN PATENT DOCUMENTS

WO   2007087573 A2   8/2007

*Primary Examiner* — Peter N Helvey
(74) *Attorney, Agent, or Firm* — Vichit Chea; Brooks Kushman P.C.

(57) ABSTRACT

A vehicle tailgate includes an internal panel, an upper panel, a lower panel, a pair of side panels, and a tie-down bracket. The internal panel extends from the upper panel to the lower panel and between the pair of side panels. The pair of side panels are rotatably secured to a cargo bed. The tie-down bracket is secured to an exterior of one of the side panels. The tie-down bracket defines a C-channel that extends along the exterior of one of the side panels from the upper panel toward the lower panel.

19 Claims, 5 Drawing Sheets

(51) Int. Cl.
*B62D 33/03* (2006.01)
*B60R 11/00* (2006.01)

(56) References Cited

U.S. PATENT DOCUMENTS

| | | |
|---|---|---|
| 5,540,474 A | 7/1996 | Holland |
| 5,971,465 A | 10/1999 | Ives et al. |
| 6,575,516 B2 | 6/2003 | Webber |
| 6,893,203 B2 | 5/2005 | Anderson et al. |
| 7,179,042 B1 | 2/2007 | Hartmann et al. |
| 7,350,843 B2 | 4/2008 | Meyers et al. |
| 7,441,295 B2 | 10/2008 | Turner |
| 7,677,626 B2 | 3/2010 | Hanzel |
| 7,717,445 B2 | 5/2010 | Peterson et al. |
| 8,857,880 B2 | 10/2014 | Kalergis et al. |
| 9,102,286 B1 | 8/2015 | Deming et al. |
| 9,346,390 B1 | 5/2016 | Croswhite |
| 10,005,497 B2 | 6/2018 | Marchlewski et al. |
| 2018/0043813 A1 | 2/2018 | Stojkovic et al. |
| 2018/0043831 A1 | 2/2018 | Stojkovic et al. |
| 2018/0072353 A1 | 3/2018 | Marchlewski et al. |

VEHICLE TAILGATE SYSTEM

REFERENCE TO RELATED APPLICATION

This application is a division of U.S. application Ser. No. 15/430,010 filed Feb. 10, 2017, now U.S. Pat. No. 10,160,396, the disclosure of which is hereby incorporated in its entirety by reference herein.

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A vehicle tailgate includes an internal panel, an upper panel, a lower panel, a pair of side panels, and a pair of tie-down brackets. The internal panel extends from the upper panel to the lower panel and between the pair of side panels. The pair of side panels are rotatably secured to a cargo bed proximate the lower panel. Each of the pair of tie-down brackets are secured to an exterior of one of the side panels. Each of the pair of tie-down brackets defines a C-channel that extends along the exterior of one of the side panels from the upper panel toward the lower panel.

A vehicle tailgate includes an internal panel, an upper panel, a lower panel, a pair of side panels, and a tie-down bracket. The internal panel extends from the upper panel to the lower panel and between the pair of side panels. The pair of side panels are rotatably secured to a cargo bed. The tie-down bracket is secured to an exterior of one of the side panels. The tie-down bracket defines a C-channel that extends along the exterior of one of the side panels from the upper panel toward the lower panel.

A vehicle tailgate includes a side panel, an upper panel, a lower panel, and a tie-down bracket. The side panel is rotatably secured to a cargo bed and extends between the upper panel and the lower panel. The tie-down bracket is secured to an exterior of the side panel. The tie-down bracket defines a C-channel that extends along the exterior from the upper panel toward the lower panel. The C-channel has an open end that faces away from the exterior of the side panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
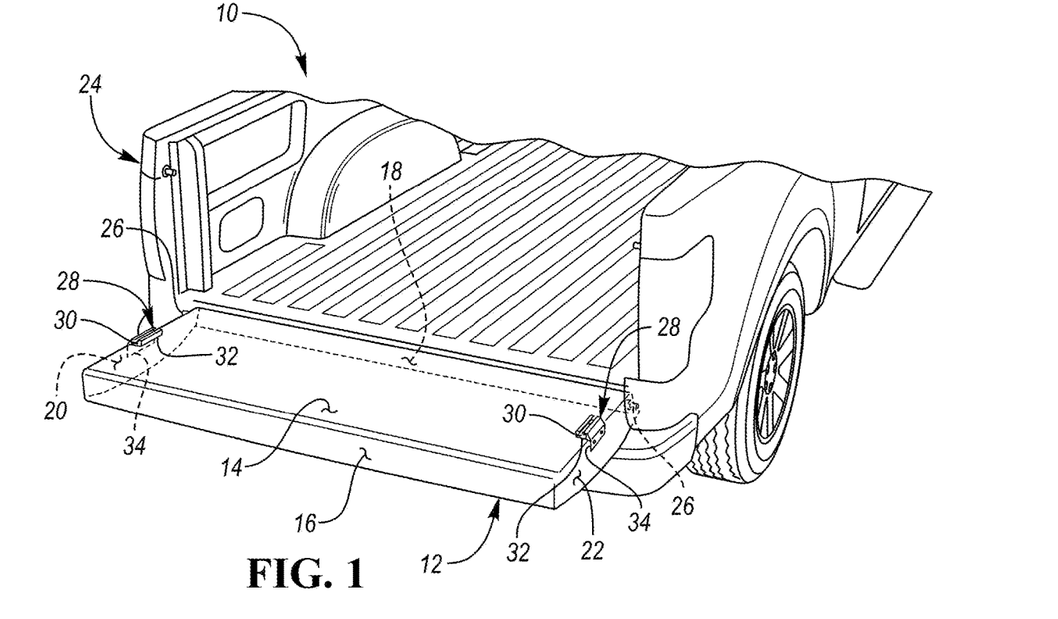
FIG. 1 is a rear perspective view of a vehicle having a tailgate in a down position and a first embodiment of a tie-down system.

Referring to FIG. 1, a rear perspective view of a vehicle 10, such as a truck, having a tailgate 12 in a down position and a first embodiment of a tie-down system is illustrated. The tailgate 12 includes an internal panel 14 that extends from an upper panel 16 to a lower panel 18. The internal panel 14 also extends between a first side panel 20 and a second side panel 22. Alternatively, the first side panel 20 and second side panel 22 may be referred to as the pair of side panels. The first side panel 20 and second side panel 22 may each be rotatably secured a cargo bed 24 by a pair of hinges 26 such that the tailgate 12 may rotate between in an up (or closed) position and a down (or opened) position. A pair of tie-down brackets 28 is secured to the exterior of the internal panel 14 between the upper panel 16 and lower panel 18. Each tie-down bracket 28 defines a C-channel 30 that extends in a direction that is substantially parallel with the first side panel 20 and second side panel 22. Substantially parallel may include any incremental value from exactly parallel to plus or minus 10° from exactly parallel. One of the tie-down brackets 28 may be secured to the internal panel 14 adjacent to the first side panel 20 while the other of the tie-down brackets 28 may be secured to the internal panel 14 adjacent to the second side panel 22.

The tie-down brackets 28 may each include a first arm 32 and a second arm 34 that extend away from each other at a center of the tie-down bracket 28. Alternatively, the first arm 32 and second arm 34 may be referred to as the pair of arms. The first arm 32 and second arm 34 of the tie-down brackets 28 may extend away from the center of the tie-down bracket 28 at a substantially perpendicular angle relative to each other. Substantially perpendicular may include any incremental value from exactly perpendicular to plus or minus 10° from exactly perpendicular. The first arm 32 of each tie-down bracket 28 may define the C-channel 30 and may be secured to the internal panel 14, while the second arm 34 of each tie-down bracket 28 may be secured to the adjacent side panel (either the first side panel 20 or second side panel 22). The first arm 32 and second arm 34 of each tie-down bracket 28 may be secured to the respective components of the tailgate 12 by a welding process or by fasteners, such as rivets, screws, bolts, or any other type of faster known to a person of ordinary skill in the art.

Figure 2:
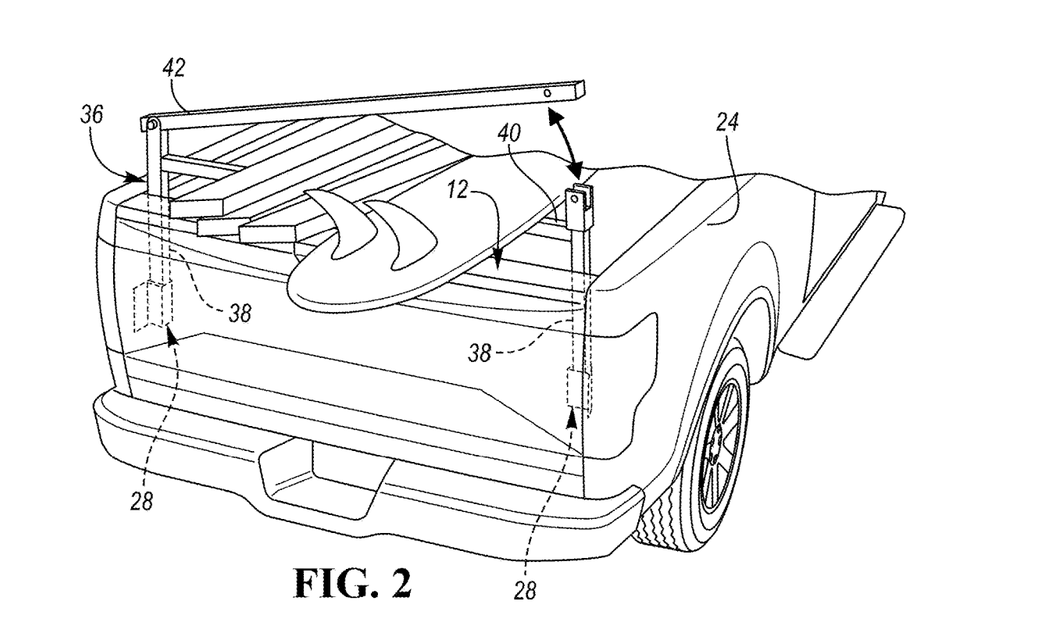
FIG. 2 is a rear perspective view of the vehicle with the tailgate in an up position and a first accessory secured to the first embodiment of the tie-down system.

Referring to FIG. 2 a rear perspective view of the vehicle 10 with the tailgate 12 in an up position is illustrated. A first accessory 36 is secured to the first embodiment of the tie-down system. More specifically, the first accessory 36 is secured within the C-channels 30 of the tie-down brackets 28. The first accessory 36 includes a pair of substantially parallel bars 38 that are secured to each other by a first crossbar 40. One of the parallel bars 38 may extend into and be secured within each of the C-channels 30 of the tie-down brackets 28. A second crossbar 42 may be rotatably secured to an end of one of the parallel bars 38 and detachably connectable to an end of the other of the parallel bars 38. The second crossbar 42 may be detachably connectable to an end of one of the parallel bars 38 by latching mechanism, clipping mechanism, locking mechanism, etc. The second crossbar 42 may be configured to rotate upwards about an end of one of the parallel bars 38 when detached from the other of the parallel bars 38. When the second crossbar 42 is connected to both parallel bars 38 items (such building materials, surfboards, etc.) that are being transported within the cargo bed 24 may be secured between the first crossbar 40 and second crossbar 42 to prevent them from shifting during transport. When the tailgate 12 is in the down position, the parallel bars 38 may be adjusted within the C-channels 30 such that they extend over the floor of the cargo bed 24, which prevents the tailgate from shifting to the up position and locks the tailgate 12 in the down position.

Figure 3:
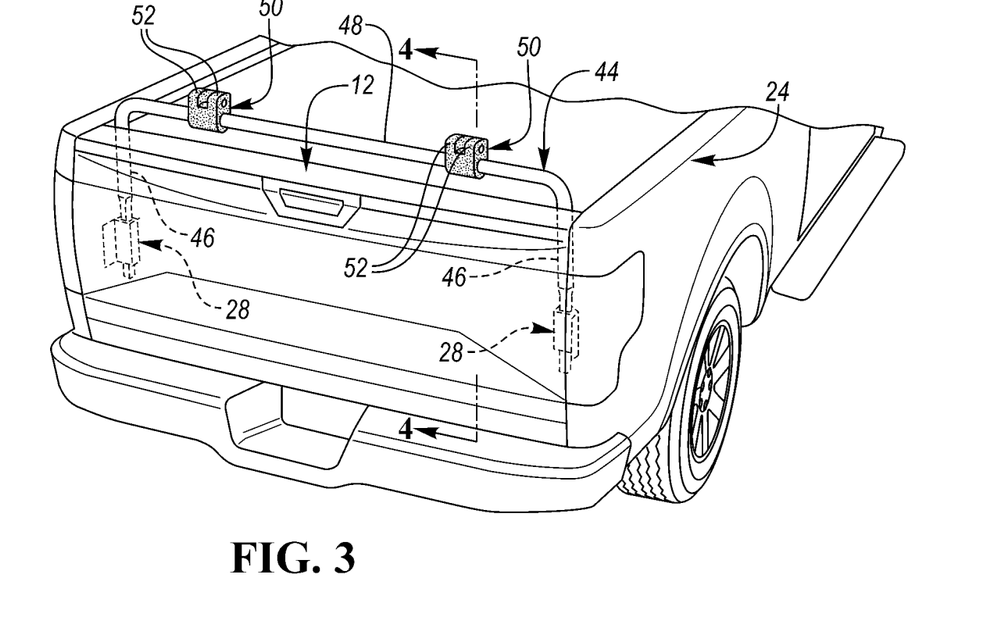
FIG. 3 is a rear perspective view of the vehicle with the tailgate in the up position and a second accessory secured to the first embodiment of the tie-down system.
Figure 4:
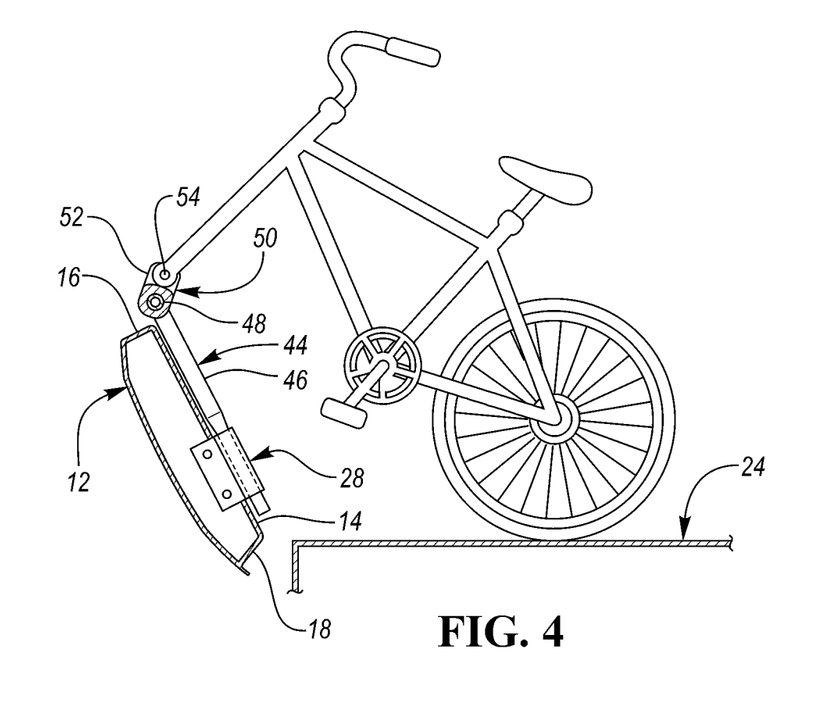
FIG. 4 is a cross-sectional view taken along line 4-4 of FIG. 3 with the tailgate partially between the up and down positions and with a bicycle secured to the second accessory.

Referring to FIGS. 3 and 4, a second accessory 44 secured to the first embodiment of the tie-down system is illustrated. More specifically, the second accessory 44 is secured within the C-channels 30 of the tie-down brackets 28. The second accessory 44 also includes a pair of substantially parallel bars 46 that are secured to each other by a crossbar 48. One of the parallel bars 46 may extend into and be secured within each of the C-channels 30 of the tie-down brackets 28. The crossbar 48 of second accessory 44 may have a circular cross-section that extends through a first orifice defined by at least one mounting bracket 50 such that the mounting bracket 50 is configured to rotate about circular cross-section of the crossbar. The mounting bracket 50 may have at least one protrusion 52 that extends outward from the first orifice that the crossbar 48 extends through. The protrusion 52 may define a second orifice that is configured to receive a fastener 54, such as bolt or pin, to rotatably secure an item of cargo (e.g., a bicycle) to the mounting bracket 50. More specifically, the mounting bracket 50 may include a pair of protrusions 52 that extend outward from the first orifice, where the pair of protrusion are divided by a slot defined within the bracket. The pair of protrusions 52 may define aligned orifices that are configured to receive the fastener 54 to rotatably secure the item of cargo to the mounting bracket 50, while the item of cargo is disposed within the slot defined between the pair of protrusions 52.

Figure 5:
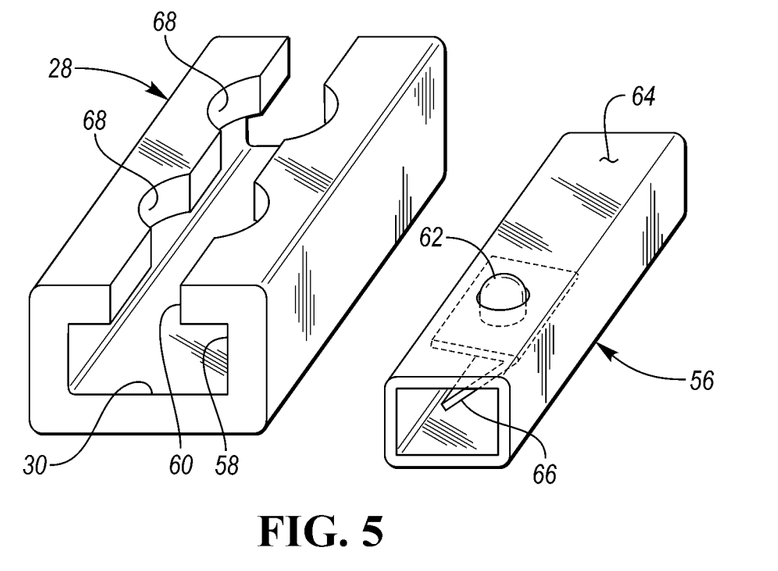
FIG. 5 is a tie-down bracket and accessory attachment mechanism.

Referring to FIG. 5, the portion of the tie-down bracket 28 that defines the C-channel 30 and an accessory attachment mechanism 56 are illustrated. The C-channel 30 may consist of a first groove 58 that extends into a second groove 60 that comprises an opening to access the C-channel 30. The combination of the first groove 58 and second groove 60 may comprise a slot having a T-shaped cross-section. The accessory attachment mechanism 56 may be secured to or integral with a bar (e.g., the parallel bars 38 of the first accessory 36 or the parallel bars 46 of the second accessory 44) that is configured to slide within the first groove 58. A spring-loaded button 62 may extend from an interior cavity of the accessory attachment mechanism 56 and through an orifice such that it extends beyond an exterior surface 64 of the accessory attachment mechanism 56. When the spring-loaded button 62 is depressed, the accessory attachment mechanism 56 may freely slide back and forth within the first groove 58. When the spring-loaded button 62 is released a biasing element 66 that is disposed within the interior cavity of the accessory attachment mechanism 56 may force the spring-loaded button 62 into notches 68 defined by the tie-down bracket 28 along the second groove 60. Alternatively, an accessory device (e.g., the parallel bars 38 of the first accessory 36 or the parallel bars 46 of the second accessory 44) may be secured to the tie-down bracket 28 by a bolt/T-nut combination or T-bolt/nut combination that extends through an orifice defined by the accessory device and engages the first groove 58 of the C-channel 30.

Additional accessories may include a work table (that may include power tools such as a miter saw), a grill (that may include utensil drawers), ramps that are securable to a crossbar that is connected to parallel bars that are secured within the tie-down brackets 28 (e.g., see first accessory 36 or second accessory 44 above), or any other useful device that may be attached to the tailgate 12 via the tie-down brackets 28.

Figure 6:
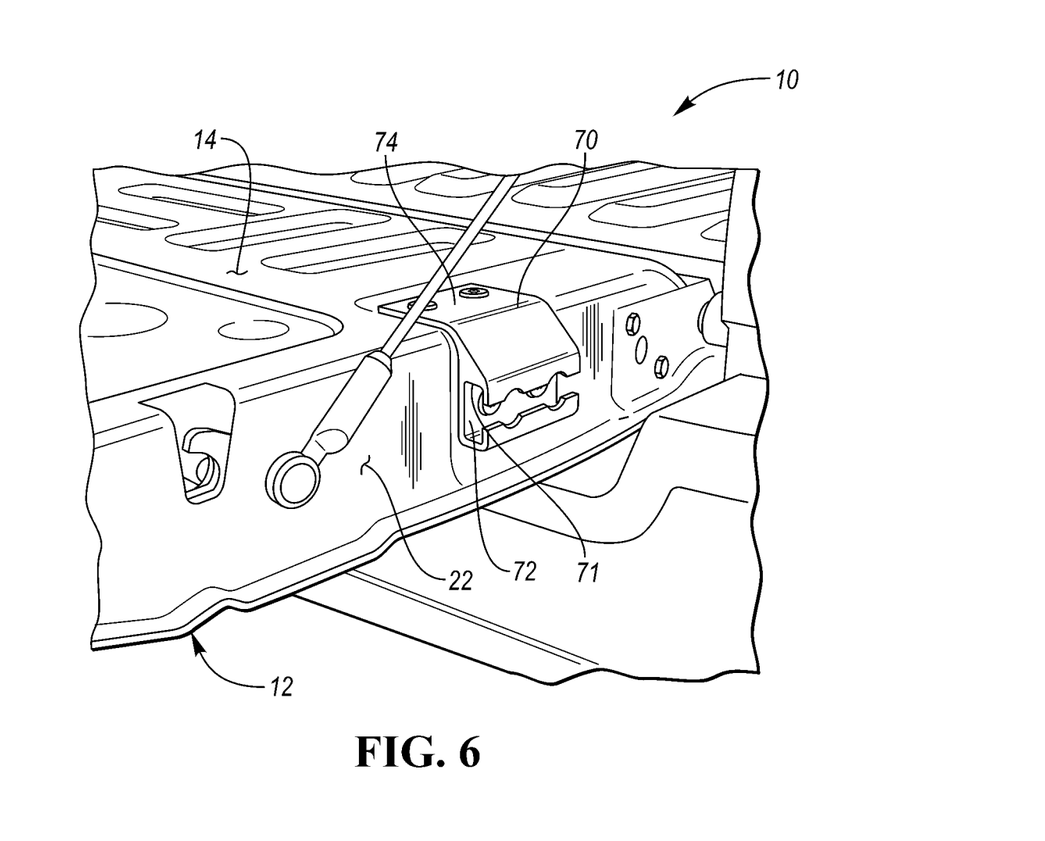
FIG. 6 is a rear perspective view of the vehicle with the tailgate in the down position and a second embodiment of tie-down system.

Referring to FIG. 6, a rear perspective view of the vehicle 10 with the tailgate 12 in the down position and a second embodiment of a tie-down system is illustrated. A tie-down bracket 70 is secured to the exterior of the second side panel 22 between the upper panel 16 and lower panel 18. Alternatively, the tie-down bracket 70 may be secured to the exterior of the first side panel 20 between the upper panel 16 and lower panel 18 as opposed to being secure to the second side panel 22, or a second tie-down bracket 70 may be secured to the exterior of the first side panel 20 in addition to the tie-down bracket 70 that is secured to the exterior of the second side panel 22. The tie-down bracket 70 defines a C-channel 71 that extends in a direction that is substantially parallel with the first side panel 20 and second side panel 22. Substantially parallel may include any incremental value from exactly parallel to plus or minus 10° from exactly parallel. The tie-down bracket 70 may be secured to the second side panel 22 adjacent to the internal panel 14. In the alternative where a tie-down bracket 70 may be secured to the first side panel 20 in addition to or in lieu of the tie-down bracket 70 secured to the second side panel 22, the other of the tie-down brackets 70 may be secured to the first side panel 20 adjacent to the internal panel 14.

The tie-down bracket 70 may include a first arm 72 and a second arm 74 that extend away from each other at a center of the tie-down bracket 70. Alternatively, the first arm 72 and second arm 74 may be referred to as the pair of arms. The first arm 72 and second arm 74 of the tie-down brackets 70 may extend away from the center of the tie-down bracket 70 at a substantially perpendicular angle relative to each other. Substantially perpendicular may include any incremental value from exactly perpendicular to plus or minus 10° from exactly perpendicular. The first arm 72 of the tie-down bracket 70 may define the C-channel 71 and may be secured to the second side panel 22, while the second arm 74 of the tie-down bracket 70 may be secured to the adjacent internal panel 14. In the alternative where a tie-down bracket 70 may be secured to the first side panel 20 in addition to or in lieu of the tie-down bracket 70 secured to the second side panel 22, the first arm 72 of the tie-down bracket 70 may define the C-channel 71 and may be secured to the first side panel 20, while the second arm 74 of the tie-down bracket 70 may be secured to the adjacent internal panel 14. The first arm 72 and second arm 74 of the tie-down bracket 70 may be secured to the respective components of the tailgate 12 by a welding process or by fasteners, such as rivets, screws, bolts, or any other type of faster known to a person of ordinary skill in the art.

Figure 7:
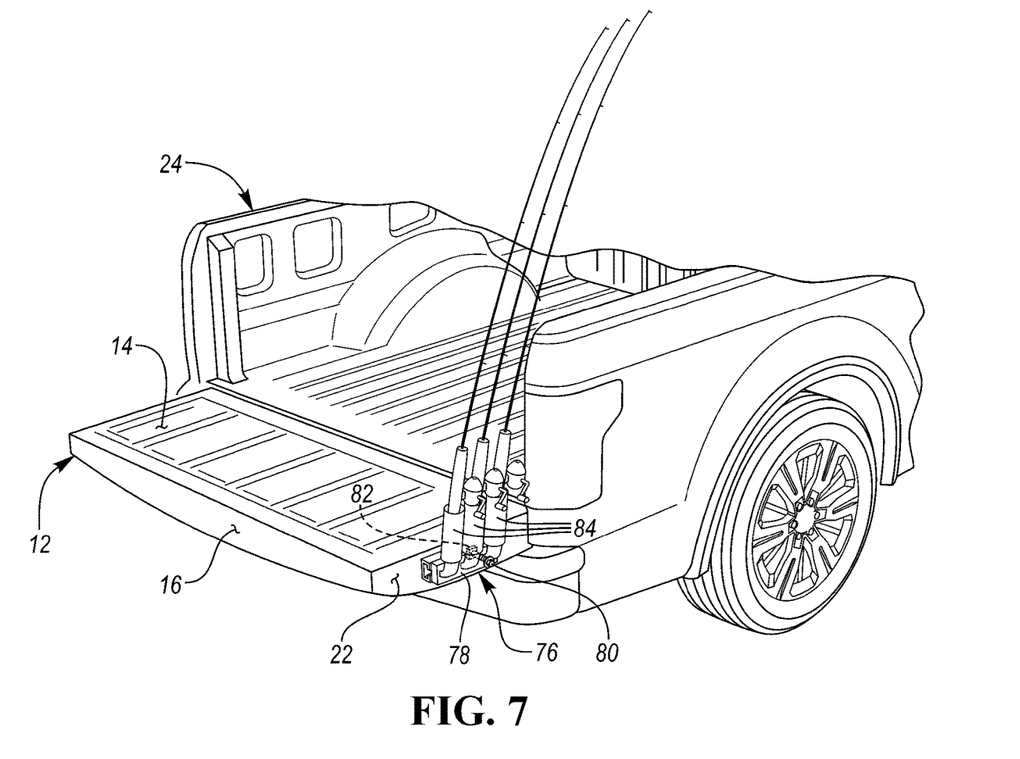
FIG. 7 is a rear perspective view of the vehicle with the tailgate in the down position and a third accessory secured to the second embodiment of the tie-down system.

Referring to FIG. 7 a rear perspective view of the vehicle 10 with the tailgate 12 in the down position is illustrated. A third accessory 76 is secured to the second embodiment of the tie-down system. More specifically, an accessory bracket 78 of the third accessory 76 is secured to the tie-down bracket 70 by a fastener 80 that is threaded into a T-nut 82 that engages the C-channel 71 of the tie-down bracket 70. The accessory bracket 78 may include at least one cylinder 84 that extends upwards and is configured to holster a fishing rod.

Figure 8:
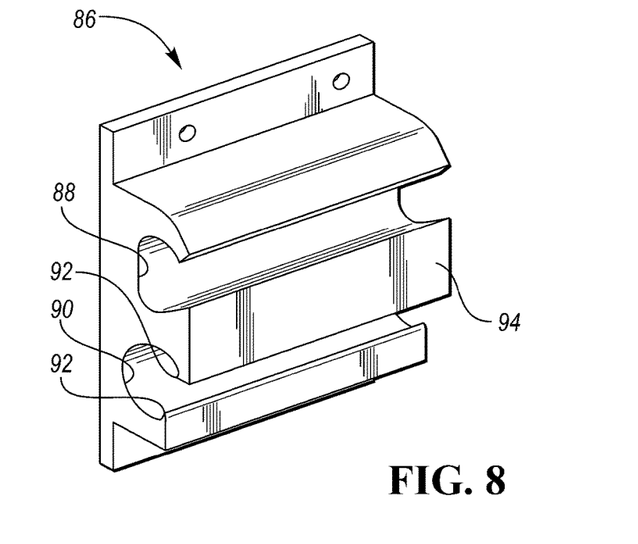
FIG. 8 is an alternative tie-down bracket.

Referring to FIG. 8, an alternative tie-down bracket 86 is illustrated. The tie-down bracket 86 defines a first C-channel 88 and a second C-channel 90. The exterior surface of the tie-down bracket 86 forms peaks 92 that point towards a center of the second C-channel 90 form a bottle opener. The tie-down bracket 86 also includes a protrusion 94 that is disposed between the first C-channel 88 and the second C-channel 90. It should be understood that the tie-down brackets in the first and second embodiments of the tie-down system (i.e., tie-down bracket 28 and tie-down bracket 70) may include a second C-channel that defines a bottle opener similar to the second C-channel 90 that defines the bottle opener in tie-down bracket 86.

Figure 9:
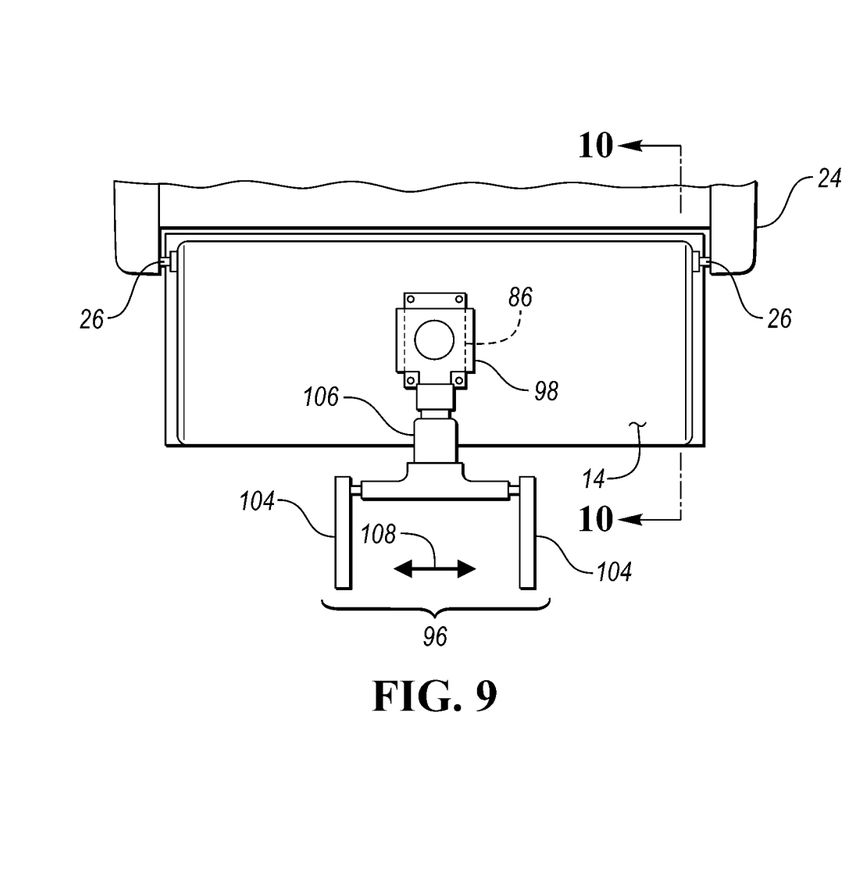
FIG. 9 is a top view of the vehicle with the tailgate in the down position, a third embodiment of tie-down system, and a fourth accessory secured to the third embodiment of the tie-down system.
Figure 10:
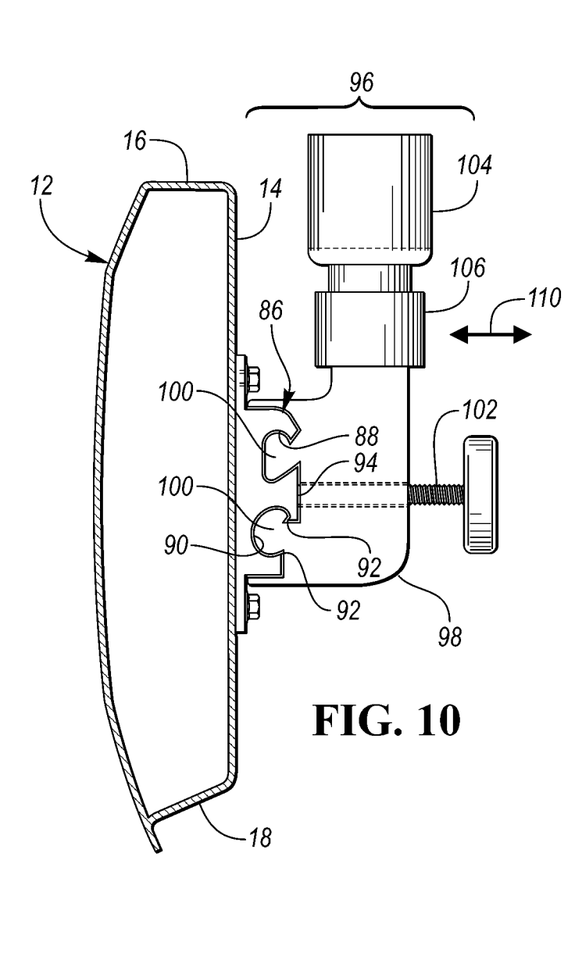
FIG. 10 is a cross-sectional view taken along line 10-10 in FIG. 9.

Referring to FIGS. 9 and 10, a third embodiment of a tie-down system and a fourth accessory 96 are illustrated. The third embodiment of the tie-down system may include securing the tie-down bracket 86 to an exterior of the internal panel 14 of the tailgate 12 such that the first C-channel 88 and second C-channel 90 extend in a direction that is substantially parallel with the upper panel 16. Substantially parallel may include any incremental value from exactly parallel to plus or minus 10° from exactly parallel. The fourth accessory 96 may include an accessory bracket 98 that includes a pair of protrusions 100. The pair of protrusions 100 may be configured to engage the first C-channel 88 and second C-channel 90 to secure the accessory bracket 98 to the tie-down bracket 86. The pair of protrusions 100 may be configured to slide into and out of the first C-channel 88 and second C-channel 90 from the side of the tie-down bracket 86. Other than sliding into out of the first C-channel 88 and second C-channel 90 from the side of the tie-down bracket 86, the pair of protrusions 100 may be keyed (i.e., they may fit into the C-channels like a jigsaw puzzle) to secure the accessory bracket 98 to the tie-down bracket 86. The accessory bracket 98 may define a threaded orifice. A set screw 102 may be threaded into the threaded orifice and may be configured to engage the protrusion 94 of the tie-down bracket 86 in order to secure the position of the accessory bracket 98 relative to the tie-down bracket 86. A pair of extendable arms 104 and a support table 106 may be secured to and extend from the accessory bracket 98. The pair of extendable arms 104 may be configured to support a workpiece. The distance between the pair of extendable arms 104 may be adjustable in the direction represented by double arrow 108. The support table 106 may be configured to act as a mounting location for a tool (including power tools such as a miter saw). The height of the support table 106 may be adjustable in the direction represented by double arrow 110.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle tailgate comprising:
    an internal panel extending from an upper panel to a lower panel and between a pair of side panels that are rotatably secured to a cargo bed proximate the lower panel;
    a pair of tie-down brackets, each secured to an exterior of one of the side panels and defining a C-channel that extends along the exterior of one of the side panels from the upper panel toward the lower panel; and
    an accessory bracket secured to a first of the tie-down brackets by a fastener that is threaded into a T-nut that engages the C-channel of the first of the tie-down brackets.

2. The tailgate of claim 1, wherein open ends of each C-channel face away from the exterior of one of the side panels.

3. The tailgate of claim 1, wherein the tie-down brackets each have a pair of arms that extend away from a center at a substantially perpendicular angle relative to each other.

4. The tailgate of claim 3, wherein a first of the pair of arms of each tie-down bracket defines one of the C-channels and is secured to the exterior of one of the side panels.

5. The tailgate of claim 4, wherein the first of the pair of arms of each tic-down bracket is secured to the exterior of one of the side panels via fasteners.

6. The tailgate of claim 4, wherein a second of the pair of arms of each tie-down bracket is secured to an exterior of the internal panel.

7. The tailgate of claim 6, wherein the second of the pair of arm of each tie-down bracket is secured to the exterior of the internal panel via fasteners.

8. The tailgate of claim 1, wherein the accessory bracket includes at least one cylinder that extends upwards and is configured to holster a fishing rod.

9. A vehicle tailgate comprising:
    an internal panel extending from an upper panel to a lower panel and between a pair of side panels that are rotatably secured to a cargo bed;
    a tie-down bracket secured to an exterior of one of the side panels and defining a C-channel that extends along the exterior of one of the side panels from the upper panel toward the lower panel; and an accessory bracket secured to the tie-down bracket by a fastener that is threaded into a T-nut that engages the C-channel of the tie-down bracket.

10. The tailgate of claim 9, wherein an open end the C-channel faces away from the exterior of one of the side panels.

11. The tailgate of claim 9, wherein the tie-down bracket has a pair of arms that extend away from a center at a substantially perpendicular angle relative to each other.

12. The tailgate of claim 11, wherein a first of the pair of arms of the tie-down bracket defines the C-channel and is secured to the exterior of one of the side panels.

13. The tailgate of claim 12, wherein the first of the pair of arms of the tie-down bracket is secured to the exterior of one of the side panels via fasteners.

14. The tailgate of claim 12, wherein a second of the pair of arms of the tie-down brackets secured to an exterior of the internal panel.

15. The tailgate of claim 14, wherein the second of the pair of arm of the tie-down bracket is secured to the exterior of the internal panel via fasteners.

16. The tailgate of claim 9, wherein the accessory bracket includes at least one cylinder that extends upwards and is configured to holster a fishing rod.

17. A vehicle tailgate comprising:
a side panel rotatably secured to a cargo bed and extending between an upper panel and a lower panel;
a tie-down bracket secured to an exterior of the side panel and defining a C-channel that extends along the exterior from the upper panel toward the lower panel, the C-channel having, an open end that faces away from the exterior of the side panel; and
an accessory bracket secured to the tie-down bracket by a fastener that is threaded into a T-nut that engages the C-channel of the tie-down bracket.

18. The tailgate of claim 17, wherein the tic-down bracket has a pair of arms that extend away from a center at a substantially perpendicular angle relative to each other.

19. The tailgate of claim 17, Wherein the accessory bracket includes at least one cylinder that extends upwards and is configured to holster a fishing rod.

\* \* \* \* \*